United States Patent
Ross et al.

(10) Patent No.: US 8,650,612 B2
(45) Date of Patent: Feb. 11, 2014

(54) SECURITY CONTEXT LOCKDOWN

(75) Inventors: David Andrew Ross, Redmond, WA (US); Roberto A. Franco, Seattle, WA (US); John Green Bedworth, Redmond, WA (US); Shankar Ganesh, Bellevue, WA (US); Venkatraman V. Kudallur, Redmond, WA (US); Anantha P. Ganjam, Sammamish, WA (US); Kurt James Schmucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/361,466

(22) Filed: Jan. 30, 2012

(65) Prior Publication Data
US 2012/0131636 A1    May 24, 2012

Related U.S. Application Data

(63) Continuation of application No. 10/836,182, filed on Apr. 30, 2004, now Pat. No. 8,108,902.

(51) Int. Cl.
   *G06F 21/00* (2013.01)

(52) U.S. Cl.
   USPC ............. 726/2; 726/1; 726/3; 726/4; 726/26; 726/27; 713/166

(58) Field of Classification Search
   USPC .................. 726/1–4, 26–27; 713/166
   See application file for complete search history.

(56) References Cited

U.S. PATENT DOCUMENTS

| | | | |
|---|---|---|---|
| 5,974,549 A * | 10/1999 | Golan | 726/23 |
| 6,275,938 B1 | 8/2001 | Bond et al. | |
| 6,321,334 B1 | 11/2001 | Jerger et al. | |
| 6,366,912 B1 * | 4/2002 | Wallent et al. | 1/1 |
| 6,489,954 B1 | 12/2002 | Powlette | |
| 6,505,300 B2 | 1/2003 | Chan et al. | |
| 6,510,458 B1 | 1/2003 | Berstis et al. | |
| 6,567,918 B1 | 5/2003 | Flynn et al. | |
| 6,691,230 B1 * | 2/2004 | Bardon | 726/27 |
| 6,766,458 B1 | 7/2004 | Harris et al. | |
| 6,802,003 B1 | 10/2004 | Gross et al. | |
| 6,968,539 B1 | 11/2005 | Huang et al. | |
| 7,111,176 B1 | 9/2006 | Ellison et al. | |
| 7,162,739 B2 | 1/2007 | Cowden et al. | |
| 7,225,157 B2 | 5/2007 | Howard et al. | |

(Continued)

OTHER PUBLICATIONS

"Advisory Action", U.S. Appl. No. 10/836,182, (Feb. 8, 2008), 3 pages.

(Continued)

*Primary Examiner* — Yin-Chen Shaw
(74) *Attorney, Agent, or Firm* — Andrew Sanders; Micky Minhas; Wolfe-SBMC

(57) ABSTRACT

A method and system for locking down a local machine zone associated with a network browser is provided. Placing the local machine zone in a lockdown mode provides stricter security settings that are applied to active content attempting to publish within a local page open in the network browser. The stricter setting are provided in a new set of registry keys that correspond to the lockdown mode of the local machine zone. The original security settings remain unchanged so that other systems and applications functionality that depends on the original security settings remains unaffected for the local machine zone. A user may also selectively allow active content to render despite the local machine zone being locked down.

20 Claims, 5 Drawing Sheets

(56) References Cited

U.S. PATENT DOCUMENTS

| | | |
|---|---|---|
| 7,293,070 B2 | 11/2007 | Moses et al. |
| 7,318,238 B2 * | 1/2008 | Elvanoglu et al. ............... 726/30 |
| 7,475,404 B2 | 1/2009 | Hamel |
| 7,571,459 B2 | 8/2009 | Ganesh et al. |
| 8,108,902 B2 | 1/2012 | Ross et al. |
| 2002/0026605 A1 | 2/2002 | Terry |
| 2002/0099952 A1 * | 7/2002 | Lambert et al. ............... 713/200 |
| 2002/0144130 A1 | 10/2002 | Rosner et al. |
| 2003/0154265 A1 | 8/2003 | Raffaele et al. |
| 2004/0006706 A1 | 1/2004 | Erlingsson |
| 2005/0021947 A1 | 1/2005 | Doyle et al. |
| 2005/0114658 A1 | 5/2005 | Dye et al. |

OTHER PUBLICATIONS

"Final Office Action", U.S. Appl. No. 10/836,182, (Apr. 29, 2009), 32 pages.

"Final Office Action", U.S. Appl. No. 10/836,182, (Feb. 19, 2010), 18 pages.

"Non-Final Office Action", U.S. Appl. No. 10/836,182, (Oct. 2, 2009), 18 pages.

"Non-Final Office Action", U.S. Appl. No. 10/836,182, (May 26, 2011), 7 pages.

"Notice of Allowance", U.S. Appl. No. 10/836,182, (Sep. 22, 2011), 17 pages.

* cited by examiner

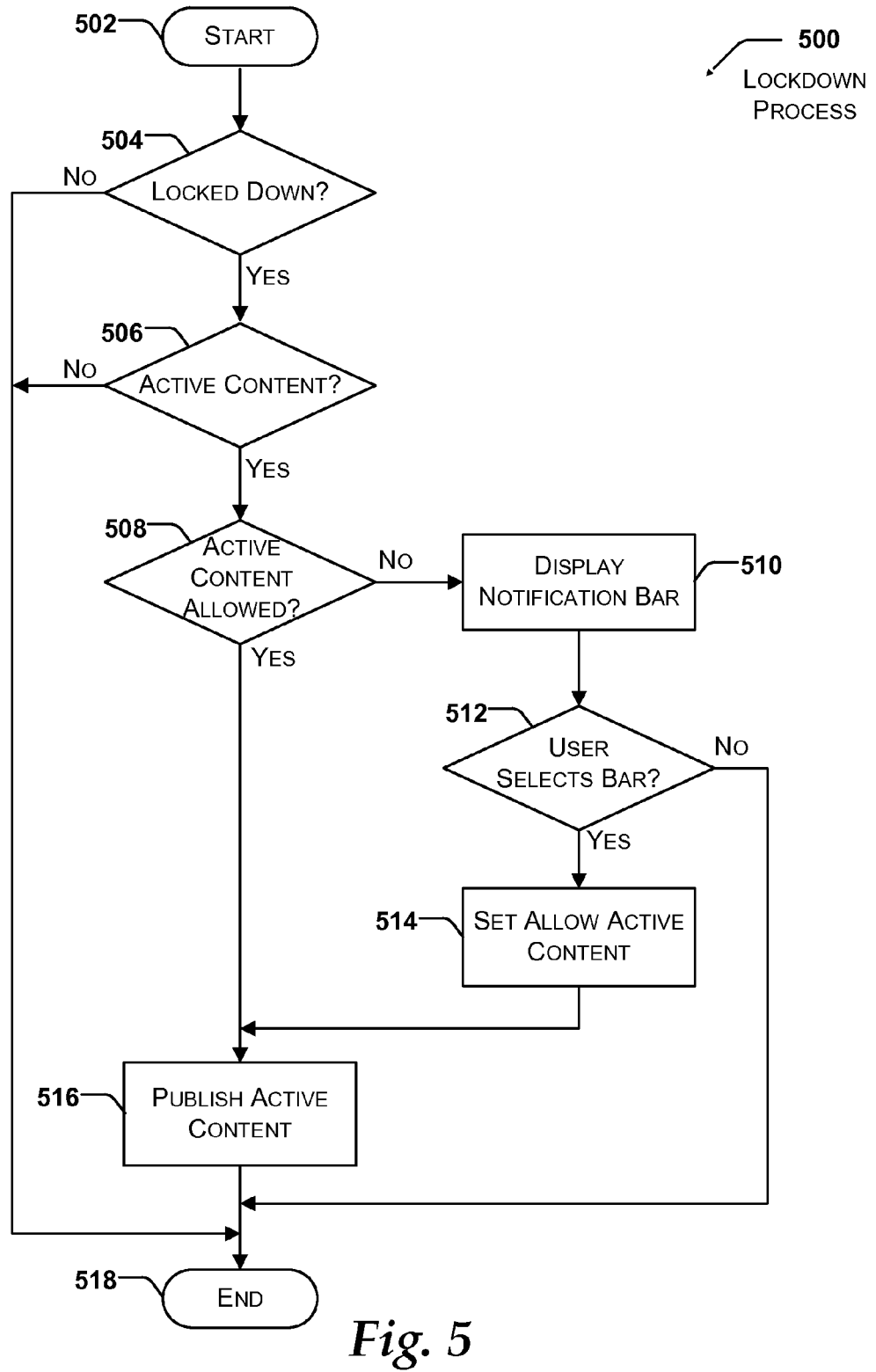

SECURITY CONTEXT LOCKDOWN

PRIORITY

This application is a continuation of and claims priority under 35 U.S.C. §120 to U.S. patent application Ser. No. 10/836,182, filed on Apr. 30, 2004 and titled "System and Method for Local Machine Lockdown with Relation to a Network Browser," issuing as U.S. Pat. No. 8,108,902 on Jan. 31, 2012, the disclosure of which is incorporated by reference in its entirety herein.

BACKGROUND

The Internet can provide a user with a wealth of information and computing power, but can also result in security vulnerabilities. One class of security vulnerabilities involves improper access to a particular URL (Uniform Resource Locator) security zone. A URL security zone includes a group of URL namespaces that are assigned an equal level of permissions (or trust). Each URL action for the zone has an appropriate URL policy assigned to it that reflects the level of trust given to the URL namespaces in that zone. The URL actions may include actions that a browser can take that might pose a security risk to the local computer. Actions that might pose a security risk include actions such as running a JAVA applet or an ACTIVEX control. Additionally, certain ACTIVEX controls determine that they are hosted in a security zone where possibly unsafe actions are permissible. A malicious script that gains access to this security zone may be able to repurpose the ACTIVEX control for impermissible actions. The URL policy that controls these actions within the security zone, determines what permission or trust level is set for a particular URL action. For example, the policy may dictate that the safety level for such ACTIVEX controls be set to high.

Certain browsers divide URL namespaces into URL security zones, which are assigned different levels of trust. The default URL security zones may be customized by changing the URL policy settings for each URL action. Each URL security zone has a set of URL actions with a URL policy assigned to each action. A URL policy is assigned to each URL action to determine how that URL action is handled. A number of default security zones have been created to assist in the assignment of security policies to various browser actions, including the local intranet zone, trusted sites zone, Internet zone, restricted sites zone, and local machine zone.

Users use the local intranet zone for content located on an organization's intranet. Since the servers and information is within an organization's firewall, a user or organization can assign a higher trust level to the content on the intranet.

Users use the trusted sites zone for content located on Web sites that are considered more reputable or trustworthy than other sites on the Internet. Users can use this zone to assign a higher trust level to these sites to minimize the number of authentication requests. The user adds the URLs of these trusted Web sites to this zone.

Users use the Internet zone for Web sites on the Internet that do not belong to another zone. This default setting causes the Web browser to prompt the user whenever potentially unsafe content is ready to download. Web sites that are not mapped into other zones automatically fall into this zone.

Users use the restricted sites zone for Web sites that contain content that can cause, or may have previously caused, problems when downloaded. Users can use this zone to cause the Web browser to alert them whenever potentially unsafe content is about to download, or to prevent that content from downloading. The user adds the URLs of these mistrusted Web sites to this zone.

The local machine zone is an implicit zone for content that exists on the local computer. The content found on the user's computer, except for content that the Web browser caches on the local system, is treated with a high level of trust.

An entity attempting to improperly gain access to a user's computer, may attempt to get access through the local machine zone. Accordingly, the local machine zone presents a possible security vulnerability if unauthorized entities gain access to this security zone.

SUMMARY

The present invention is directed toward a method and system for locking down the local machine zone associated with a network browser. When a Web page is opened in a browser, the browser puts restrictions on what the page can do based on from where that Web page came, e.g., from the Internet, from a local intranet server, from a trusted site, or other location. Web pages on a user's computer that are in the local machine security zone have the fewest security restrictions. In this regard, the local machine zone, or local machine security context, allows client-side script in markup (e.g., HTML, XML, SGML, XHTML, etc.) to run with elevated privileges. The elevated privileges allow developers to create powerful applications. Unfortunately, unauthorized entities also try to take advantage of the power of the local machine zone to elevate their privileges. When unauthorized entities gain access to the local machine zone they are able to execute code that may do damage or improperly access restricted content. In accordance with the present invention, when a network browser attempts to read the URL action registry keys in the local machine zone, the browser receives back certain pre-determined values. The keys in the registry have not changed, but an alternate set of keys has been provided. This alternate set of keys "locks down" the local machine zone. These additional keys are also referred to as "shadow keys". The original security settings are not changed for lockdown mode since a number of other systems and applications may have functionality that depends on the original security settings for the local machine zone. Instead alternate settings are provided for the lockdown mode. With the alternate settings, the actual security settings used for the security zones are replaced when the network browser is run in the local machine zone. In effect, the privileges otherwise provided in the local machine zone are locked down. Locking down the privileges increases the security and prevents unauthorized entities from a taking advantage of the usual privileges provided in the local machine zone.

In accordance with one aspect of the present invention, a computer-implemented method for protecting a user from unsafe content is provided. A determination is made whether active content is to be rendered in a local machine security context, and whether the local machine security context is locked down. If the local machine security context is locked down, the active content is prevented from rendering. However, the active content may be rendered when selected by the user.

BRIEF DESCRIPTION OF THE DRAWINGS

FIG. 5 is an operational flow diagram illustrating a process for handling active content when the local machine zone is locked down, in accordance with the present invention.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
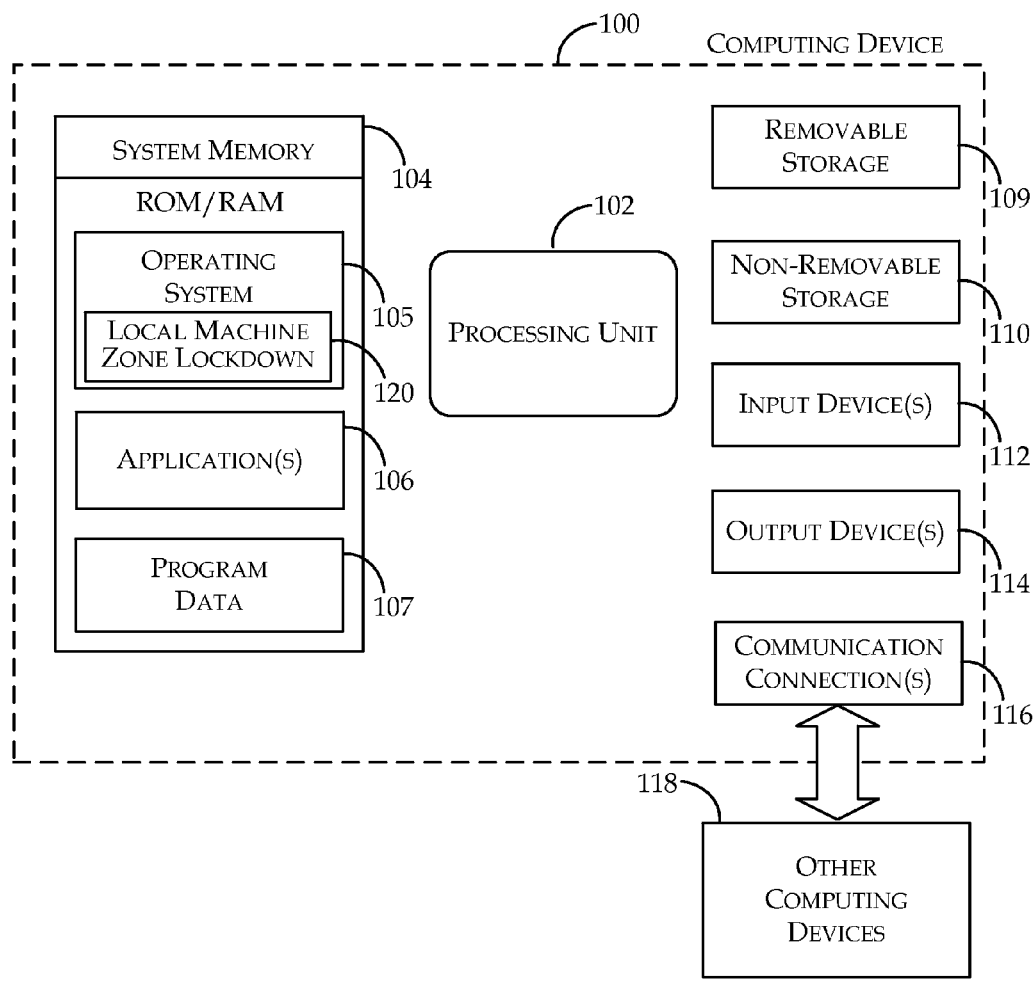
FIG. 1 illustrates a computing device that may be used according to an example embodiment of the present invention.

With reference to FIG. 1, one example system for implementing the invention includes a computing device, such as computing device 100. Computing device 100 may be configured as a client, a server, mobile device, or any other computing device that provides security zones for a network browser. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105 having functionality for implementing the local machine lockdown 120, one or more applications 106, and may include program data 107. The present invention, which is described in detail below, is implemented within system memory 104.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Local Machine Zone Lockdown

As previously stated, the local machine zone is a security zone associated with a network browser. The local machine zone is a security zone that has fewer security restrictions than other security zones associated with the network browser. Accordingly, markup that runs in the local machine zone may run relatively unhindered by security limitations. Applications operating in the local machine zone may therefore have a number of operable features with the increased level of privileges that the local machine zone provides.

However, the increased level of privileges of the local machine zone creates a vulnerability to malicious active content running within the local machine zone. Active content refers to data that includes script or markup that results in an action as opposed to static content (e.g., simple text or images) that is simply displayed. In this sense, active content may include HTML, since HTML or script within HTML may redirect the browser elsewhere, or load and run applications. Active content may also include animated GIFs, since the animation provides activity beyond simple display. Active content also often refers to web pages that include executable script, such as JAVA applets, ACTIVEX controls, JSCRIPT/ECMAScript, VBScript, and managed .NET code.

The present invention may be used to prevent active content from running within the local machine zone by locking down the local machine zone. The privileges associated with the local machine zone are rescinded in favor of increased security. The security settings that set the local machine zone's level of security restrictions involving active content, are substituted with security settings that increase the security procedures applied to the active content, or prevent the active content from running. The present invention avoids changing the original security settings since a number of other systems and applications may have functionality that depends on the original security settings for the local machine zone. One embodiment for locking down the local machine zone, or the lockdown mode, is described in the following figures and accompanying description.

Figure 2:
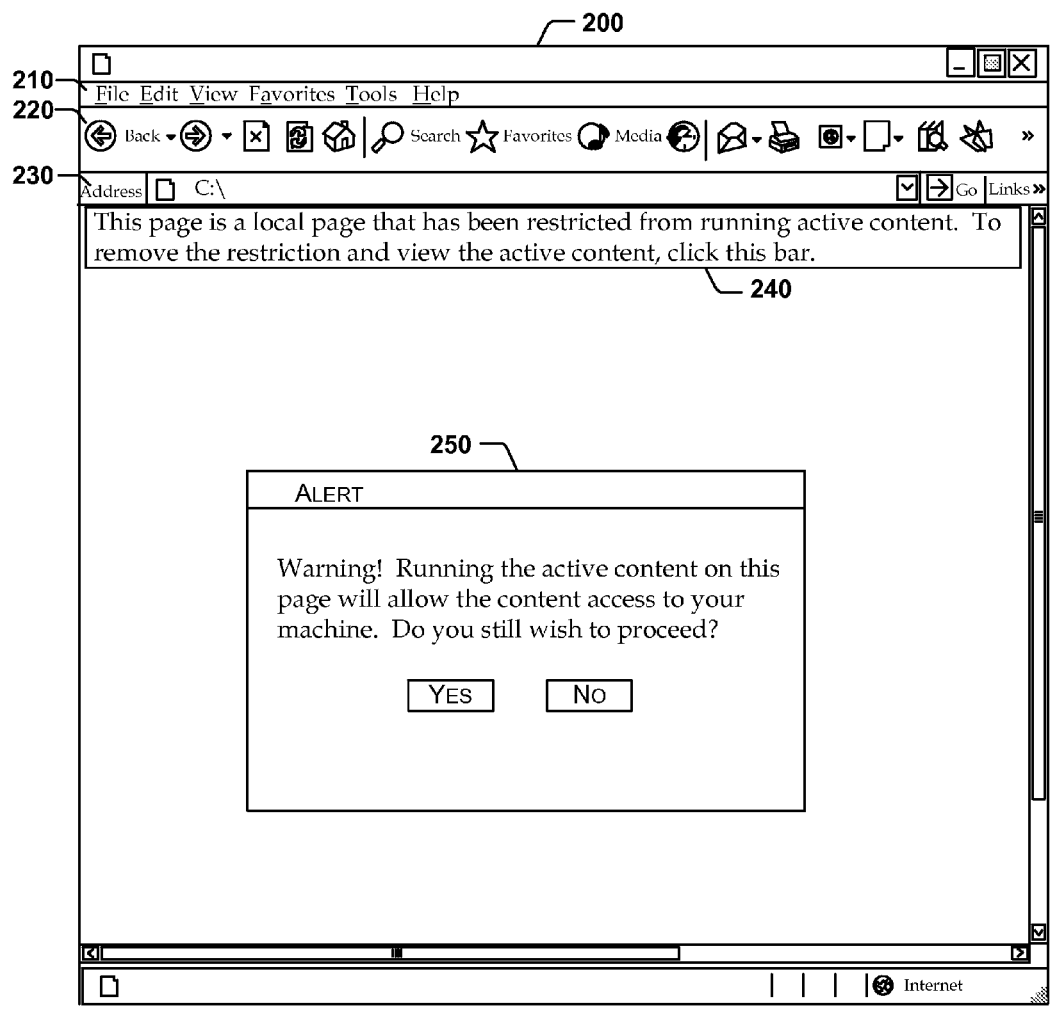
FIG. 2 is a functional block diagram illustrating an exemplary network browser page where active content in the local machine zone is locked down, in accordance with the present invention.

FIG. 2 is a functional block diagram illustrating an exemplary network browser page where active content in the local machine zone is locked down, in accordance with the present invention. Network browser page 200 includes toolbars 210 and 220, and address field 230. Toolbars 210 and 220 provide selectable buttons and pull down menus for selecting browser functions. Toolbars similar to toolbars 210 and 220 are well known, and therefore will not be discussed in great detail herein. Address field 230 is also well known and typically includes a URL that identifies the unique location of the document currently displayed as network browser page 200. The address currently shown in address field 230 is an address of a local page as indicated by the prefix "C:".

In addition to the typical browser elements, network browser page 200 also includes notification bar 240 and notification window 250. Notification bar 240 is displayed on network browser page 200 when the local machine zone is locked down and network browser page includes active content. The notification provided by notification bar 240 reads, "This page is a local page that has been restricted from running active content. To remove the restriction and view the active content, click this bar." Notification bar therefore notifies a user viewing network browser page 200 that the page includes active content that has been disallowed, or has been prevented from being rendered, and that the local machine zone is in a lockdown mode. The message provided in notification bar 240 is exemplary only, and other messages signifying that the local machine zone has been locked down may be provided. Furthermore, that notification bar 240 is shown as a bar is also by way of example, and other means of notifications (e.g., windows, alerts, etc.) may also be used.

In one embodiment, if a user chooses to display the active content within network browser page 200, a warning window, illustrated by notification window 250, may be displayed to the user. The warning window provides a secondary level of security for a user by indicating a possible outcome of rendering the active content. Notification window 250 reads, "Warning! Running the active content on the page will allow the content access to your computer. Do you still wish to proceed?" Notification window 250 also forces the user to affirmatively select to publish the active content, relying on the user's confidence that the active content to be displayed is secure. In other embodiments, notification window 250 is not shown and processing moves directly to publishing the active content when notification bar 240 is selected.

Figure 3:
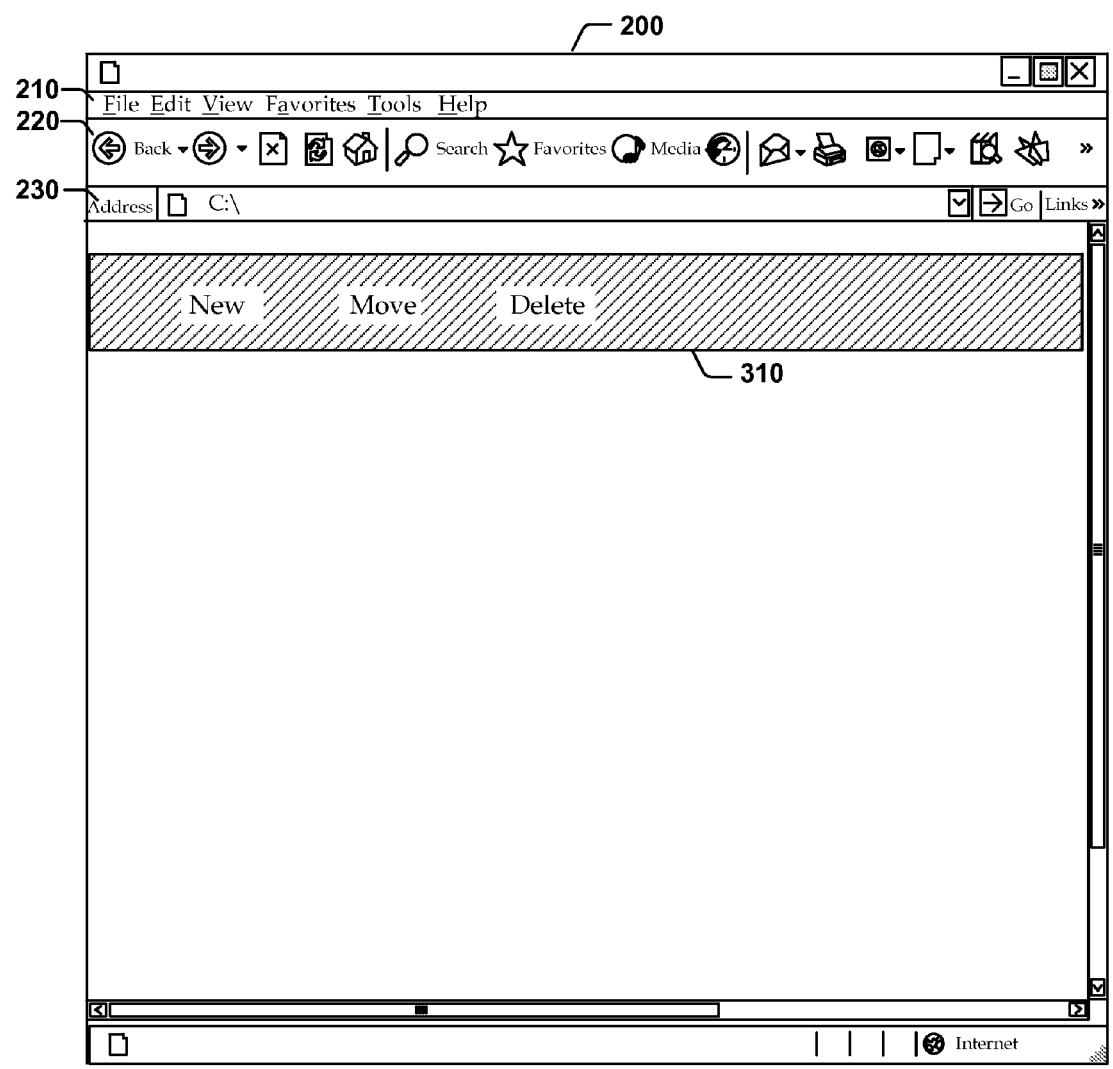
FIG. 3 is a functional block diagram illustrating the exemplary network browser page shown in FIG. 2 where active content has been selectively allowed, in accordance with the present invention.

FIG. 3 is a functional block diagram illustrating the exemplary network browser page shown in FIG. 2 where active content has been selectively allowed, in accordance with the present invention. The same network browser page shown in FIG. 2 is shown in FIG. 3, however notification bar 210 is no longer present. Instead, the active content that was previously restricted from being published is now displayed on network browser page 200 as illustrated by supplementary toolbar 310. In one embodiment, supplementary toolbar 310 is instantiated by an ACTIVEX control that was previously prevented from rendering. The ACTIVEX content was previously disallowed by the lockdown mode of the local machine zone. Accordingly, lockdown process of the local machine zone increases the security level of the local machine zone by reducing the privileges previously provided with regard to active content running within the local machine zone. Correspondingly, a user may also selectively override the lockdown of the local machine and affirmatively allow the active content to render within the network browser.

Figure 4:
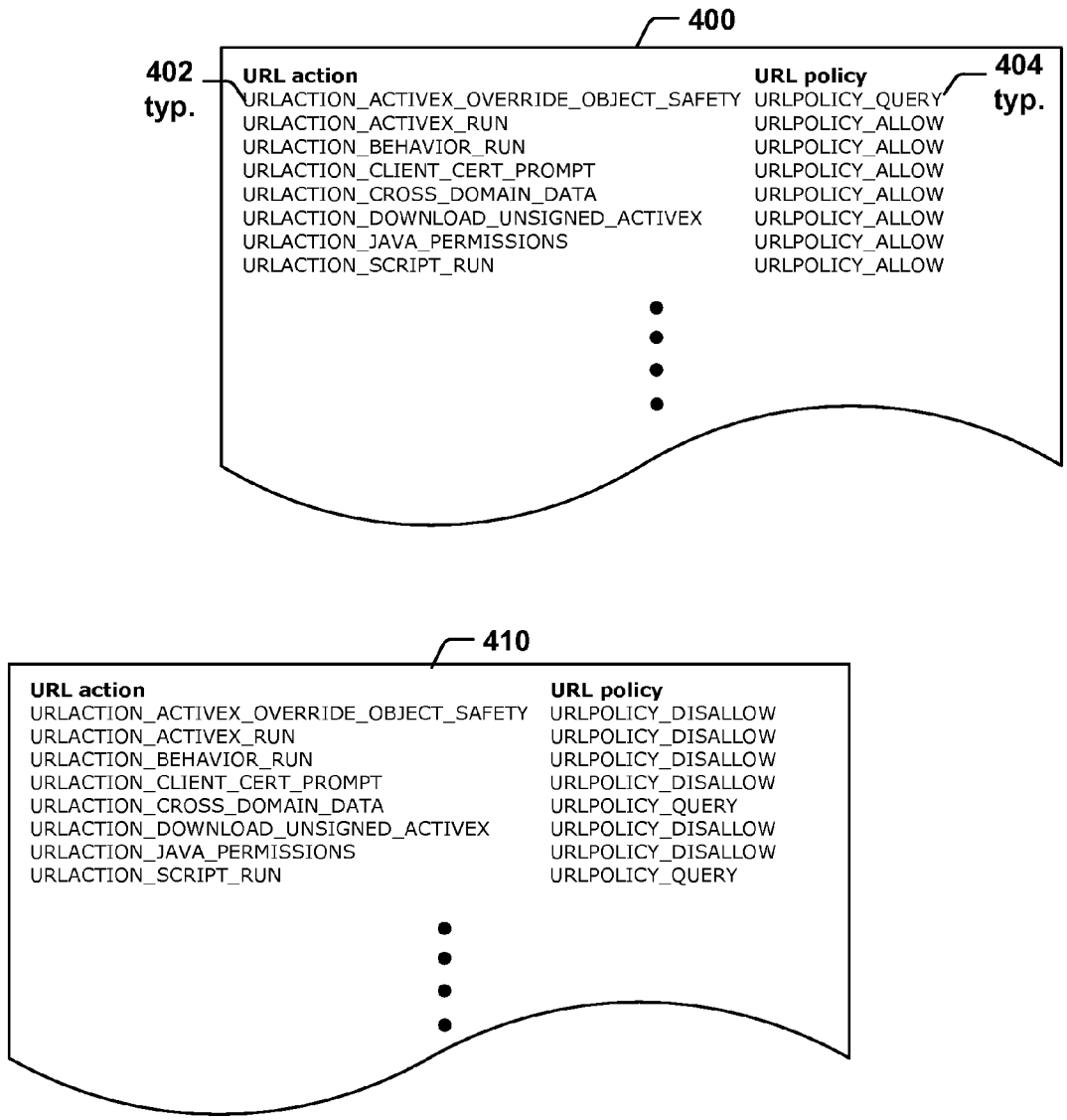
FIG. 4 illustrates an exemplary set and exemplary shadow set of URL actions and URL policies, in accordance with the present invention.

FIG. 4 illustrates an exemplary set and exemplary shadow set of URL actions and URL policies, in accordance with the present invention. As previously stated, each security zone has a set of URL actions with a URL policy assigned to each action. A URL policy is assigned to each URL action to determine how that URL action is handled. Default set 400 includes a partial list of the URL actions (e.g., 402) and corresponding URL policies (e.g., 404) for the local machine zone. Lockdown set 410 includes the same partial list of URL actions with different selected URL policies to correspond with the lockdown mode.

A feature setting is included in a registry key that selects whether to have the local machine zone in a lockdown mode. The registry is the repository for both system wide and per-user settings. The registry is a database whose structure is similar to that of a logical disk drive. The registry contains keys, which are similar to a disk's directories, and values which are comparable to files on a disk. A key is a container that can contain other keys or values, while values store data. Accordingly, for the present invention, a key is included in the registry, and depending on the contained value within the key, the lockdown mode for the local machine zone is activated or deactivated.

When the lockdown mode of the local machine zone is not active, one of two other registry keys is used to determine which set of URL actions and URL policies to use for the local machine zone, default set 400 or lockdown set 410. In one example, when the registry key corresponding to the lockdown feature has a value of 0, the local machine zone is in a default mode, or is not locked down. Therefore, the registry key referring to default set 400 is used to provide the URL actions and URL policies for the local machine zone. Correspondingly, when the registry key corresponding to the lockdown feature has a value of 1, the local machine zone is locked down, and the registry key referring to lockdown set 410 is used to provide the URL actions and URL policies for the local machine zone.

Additionally, registry keys corresponding to each URL action corresponding to each set (e.g., default set 400 and lockdown set 410) are also provided. The value contained within each registry key for each URL action corresponds to the associated URL policy. In one embodiment, if a value is 0, then the action is allowed (i.e., URLPOLICY_ALLOW), if a value is 1, then the user is prompted (i.e., URLPOLICY_QUERY), and if a value is 3, then the action is not allowed (i.e., URLPOLICY_DISALLOW).

Lockdown set 410 provides increased security by providing URL policies for the URL actions that are more strict than the URL policies provided in default set 400. Both default set 400 and lockdown set 410 are not meant as exhaustive lists of URL actions corresponding to the local machine zone and are provided by way of example only. The URL actions included in default set 400 and lockdown set 410 are provide to illustrate some the possible URL actions associated with active content.

In addition to the above described registry keys is a setting for recording a user's selection to change back from a lockdown mode to the default, or unlocked mode. When the local machine zone is in a lockdown mode, a user may select to instead publish the disallowed active content despite the lockdown mode. When the user selects to publish the active content, the setting includes a value that is toggled to indicate the user's selection. The user's selection to render the active content with relation to the network browser remains enabled while the window proxy of the network browser remains the same. When the window proxy changes, the local machine zone reverts to the lockdown mode according to the feature setting in the registry.

FIG. 5 is an operational flow diagram illustrating a process for handling active content of a local page opened in a network browser, in accordance with the present invention. Process 500 begins at block 502 where the lockdown set of URL actions and URL policies is stored in the registry and a user has opened a local page in the lockdown mode. Processing continues at decision block 504.

At decision block 504, a determination is made whether the local machine zone, or local machine security context, is locked down. The feature setting in the registry, as previously described above, is examined for its value. If the value indicates the local machine zone is not locked down, processing advances to block 518, where process 500 ends. If however, the local machine zone is in a lockdown mode, processing continues at decision block 506.

At decision block 506, a determination is made whether the local page includes active content. If the local page does not include active content, processing moves to block 518, where process 500 ends. If however, the local page does include active content, processing continues at decision block 508.

At decision block 508, a determination is made whether the active content has been previously allowed by a user. When a user has previously allowed the active content, processing advances to block 516. However, if the active content was not previously allowed by a user, processing moves to block 510.

At block 510, the notification bar notifying the user that the active content was disallowed is displayed within the network browser. As previously stated, other mechanisms than a bar may be used to notify the user that the active content was not allowed to render. In this example, the bar displayed includes an indication of the option to select the bar to render the active content. Once the bar is displayed, processing moves to decision block 512.

At decision block 512, a determination is made whether the user selects the bar to indicate that the active content should be allowed to render despite the lockdown mode. If the user does not select the bar, processing advances to block 518 where process 500 ends. In another the embodiment, process 500 loops through decision block 512 until the user selects the bar or the local page is closed. If the user does select the bar, processing continues at block 514.

At block 514, a value indicating that active content should be allowed is set. As previously described, with the value set, active content continues to be allowed for the duration of the current window proxy. Once the value for allowing active content is set, processing continues at block 516.

At block 516, the active content is rendered on the local page according to the current or previous selection by the user. In one embodiment, the local page is refreshed while referencing the default set of URL actions and associated URL policies within the registry. Once the active content is rendered, processing moves to block 518 where process 500 ends.

In additional embodiments, the above described lockdown feature provided for the local machine zone may also be used for other security zones associated with a network browser. In other embodiments, further lockdown sets of URL actions and URL policies may be generated for locking down the other security zones.

In other additional embodiments, the above described lockdown feature may also be used in conjunction with applications other than a network browser. Other applications that render active content may also be locked down for a selected security context without departing from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method to implement security for an application of a computing device configured to render active content, comprising:

Identifying, by the computing device, active content for rendering by the application in a security context used to render content with elevated privileges associated with a default set of security settings for the security context, the security context defined as one of multiple security contexts configured to implement different security policies based upon different levels of trust for content associated with the multiple security contexts;

examining a feature setting indicative of a lockdown mode for the security context to determine whether or not the security context is locked down;

when the security context is not locked down, rendering the active content with the elevated privileges using the default set of security settings associated with the security context; and when the security context is locked down, preventing the rendering of the active content and locking the elevated privileges otherwise provided in the security context by using an alternate lockdown set of security settings defined for the lockdown mode in lieu of changing the default security settings associated with the security context, the alternate lockdown set of security settings including an alternate set of configuration values for security settings.

2. The computer-implemented method of claim 1, further comprising:

when the security context is locked down, allowing the active content to render in the security context with the enhanced privileges in response to receiving an explicit selection by the user.

3. The computer-implemented method of claim 1, wherein the feature setting comprises a value stored in a repository for configuration settings corresponding to the application.

4. The computer-implemented method of claim 1, wherein the application configured to render the active content is a network browser.

5. The computer-implemented method of claim 1, wherein the security context is configured to define the elevated privileges for content stored locally at the computing device.

6. The computer-implemented method of claim 1, wherein the multiple security contexts are established to reflect the different levels of trust based at least in part upon different sources of content.

7. The computer-implemented method of claim 6, wherein content from a particular source is assigned to a particular security context of the multiple security contexts by associating a uniform resource locator (URL) of the particular source with the particular security context.

8. The computer-implemented method of claim 1 further comprising displaying a notice configured to indicate that the security context is locked down when rendering of the active content is prevented.

9. The computer-implemented method of claim 1, wherein the default set of security settings for the security context are configured to assign policies to a set of actions available via the application to control execution of actions by content that is associated with the security context.

10. The computer-implemented method of claim 1, wherein preventing the rendering of the active content comprises applying policies assigned by the alternate lockdown set of security settings to a set of actions available via the application to restrict execution of actions defined by the active content.

11. A computer-readable storage device storing computer-executable instructions that, when executed by a computing device, cause the computing device to perform operations comprising:

implementing a security context for rendering of active content by an application with elevated privilege as one of multiple security contexts supported by the application that reflect different policies established for different sources of content having different levels of trust, the security context associated with a default set of security settings defining the elevated privileges and an alternate set of lockdown security settings to place increased restrictions on active content when a lockdown mode is activated for the security context;

providing a feature setting selectable to designate whether or not the lockdown mode is activated for active content in the security context; and when the lockdown mode is activated, locking down the security context to implement the increased restrictions for the active content by returning the alternate lockdown set of security settings instead of the default set of security settings for use by the application to render the active content, the alternate lockdown set of security settings including an alternate set of configuration values for security settings.

12. The computer-readable storage device of claim 11, wherein the operations further comprises:

when the lockdown mode is not activated, rendering the active content with the elevated privileges defined by the default set of security settings for the security context.

13. The computer-readable storage device of claim 11, wherein the active content is associated by the application with the security context based upon a uniform resource locator (URL) of the active content.

14. The computer-readable storage device of claim 11, wherein the active content comprises content having script and markup configured to cause one or more actions that pose a security risk.

15. The computer-readable storage device of claim 11, wherein the operations further comprise examining a value of the feature setting stored with configuration settings for the application to determine whether or not the lockdown mode is activated for the security context.

16. The computer-readable storage device of claim 11, wherein the security context is configured to enable locally stored content of the computing device to operate with the elevated privileges.

17. The computer-readable storage device of claim 11, wherein the default set of security settings for the security context remain unchanged when the lockdown mode is activated for active content and available for use by other content that does not contain active content restricted by the lockdown mode.

18. A computing device comprising:

a processing unit; and memory storing:

a content rendering application executable via the processing unit to render content from multiple sources;

a plurality of security contexts that reflect different levels of trust defined for content rendering by the application, each individual security context designating a set of security polices to control actions by content assigned to the individual security context based on a source of the content, the plurality of security contexts including at least a local security context configured to enable locally stored content of the computing device to operate with elevated privileges; and a feature setting for the local security context used to control rendering of active content by the application in the local security context, the content rendering application configured to render active content in accordance with the feature setting and the feature setting configured to select between multiple modes for the local security context including:

a default mode that causes the content rendering application to render active content with the elevated privileges using a default set of security settings; and a lockdown mode that causes the content rendering application to the render active content with increased restrictions defined by an alternate lockdown set of security settings instead of using the default set of security settings, the alternate lockdown set of security settings including an alternate set of repository values.

19. The computing device of claim 18, wherein the multiple modes include a query mode that causes the content rendering application to restrict the active content and output a message prompting for user input to remove the restriction.

20. The computing of claim 18, wherein the content rendering application is further configured to detect when content associated with the local security context does not contain active content restricted by the lockdown mode and, when the lockdown mode is activated, bypass the lockdown mode for content that does not contain active content.

* * * * *